US008086590B2

(12) United States Patent
Zheng et al.

(10) Patent No.: US 8,086,590 B2
(45) Date of Patent: Dec. 27, 2011

(54) PRODUCT SUGGESTIONS AND BYPASSING IRRELEVANT QUERY RESULTS

(75) Inventors: Can Zheng, Sammamish, WA (US);
Jigar Vijay Mody, Seattle, WA (US);
Mikhail Mikhailov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 12/110,137

(22) Filed: Apr. 25, 2008

(65) Prior Publication Data
US 2009/0271390 A1 Oct. 29, 2009

(51) Int. Cl.
*G06F 17/30* (2006.01)

(52) U.S. Cl. ........ 707/706; 707/707; 707/708; 707/709; 707/713; 707/723; 707/726; 707/765; 707/766; 707/768; 707/769; 707/771; 707/779

(58) Field of Classification Search ................ 707/1, 3, 707/5, 104.1, 999.001, 999.003, 999.005, 707/999.107, 706, 707, 708, 709, 713, 723, 707/726, 765, 766, 768, 769, 771, 779
See application file for complete search history.

(56) References Cited

U.S. PATENT DOCUMENTS

| | | | |
|---|---|---|---|
| 6,356,940 B1 * | 3/2002 | Short | 709/217 |
| 6,728,706 B2 * | 4/2004 | Aggarwal et al. | 1/1 |
| 6,895,388 B1 * | 5/2005 | Smith | 705/26.62 |
| 6,920,459 B2 * | 7/2005 | Dedhia et al. | 707/740 |
| 6,963,867 B2 | 11/2005 | Ford | |
| 7,076,443 B1 * | 7/2006 | Emens et al. | 705/14.55 |
| 7,092,936 B1 * | 8/2006 | Alonso et al. | 707/737 |
| 7,177,818 B2 * | 2/2007 | Nair | 705/346 |
| 7,325,201 B2 * | 1/2008 | Ferrari et al. | 715/737 |
| 7,505,969 B2 * | 3/2009 | Musgrove et al. | 1/1 |
| 7,577,664 B2 * | 8/2009 | Malik | 1/1 |
| 7,587,387 B2 * | 9/2009 | Hogue | 1/1 |
| 7,643,822 B2 * | 1/2010 | Ling et al. | 455/414.3 |
| 7,676,460 B2 * | 3/2010 | Morgan | 707/999.004 |
| 7,801,885 B1 * | 9/2010 | Verma | 707/713 |
| 7,831,584 B2 * | 11/2010 | Rothman | 707/706 |
| 2001/0044758 A1 * | 11/2001 | Talib et al. | 705/27 |

(Continued)

OTHER PUBLICATIONS

Rajatish Mukherjee, et al., "Analysis of domain specific ontologies for agent-oriented information retrieval," Dept. of Mathematical & Computer Sciences, Univ. of Tulsa, OK, American Association for Artificial Intelligence, 2000, 16 pp.

(Continued)

*Primary Examiner* — Don Wong
*Assistant Examiner* — Thanh-Ha Dang
(74) *Attorney, Agent, or Firm* — Shook, Hardy & Bacon LLP (57) ABSTRACT

A computer system, computer media, and computer-implemented method for generating product suggestions and providing product information are provided. The computer system includes a relevance engine, a product database, and a graphical user interface to respond to user queries and to provide product details associated with one or more products included in the user queries. The relevance engine determines which products are similar to products included in the user queries. The graphical user interface displays product suggestions that refine the user queries without executing the query on the product database, where a subset of the product suggestions are linked to product details pages. User selection of any of the product suggestions within the subset directs the user to a product details page for a specific product and bypasses a listing of results having many products that match the refined user queries.

18 Claims, 5 Drawing Sheets

U.S. PATENT DOCUMENTS

| | | | |
|---|---|---|---|
| 2002/0016741 A1 | 2/2002 | Black | |
| 2003/0033296 A1* | 2/2003 | Rothmuller et al. | 707/3 |
| 2003/0212669 A1* | 11/2003 | Dedhia et al. | 707/3 |
| 2004/0006518 A1 | 1/2004 | Takahashi | |
| 2004/0155109 A1 | 8/2004 | Kenney | |
| 2004/0186827 A1* | 9/2004 | Anick et al. | 707/3 |
| 2005/0216362 A1* | 9/2005 | Navar et al. | 705/26 |
| 2005/0234881 A1* | 10/2005 | Burago et al. | 707/3 |
| 2006/0167864 A1* | 7/2006 | Bailey et al. | 707/3 |
| 2006/0248078 A1* | 11/2006 | Gross et al. | 707/5 |
| 2006/0271524 A1* | 11/2006 | Tanne et al. | 707/3 |
| 2006/0282416 A1* | 12/2006 | Gross et al. | 707/3 |
| 2006/0288000 A1* | 12/2006 | Gupta | 707/5 |
| 2007/0027856 A1* | 2/2007 | Lee | 707/3 |
| 2007/0073641 A1* | 3/2007 | Perry et al. | 707/2 |
| 2007/0100915 A1 | 5/2007 | Rose | |
| 2007/0106659 A1* | 5/2007 | Lu et al. | 707/5 |
| 2007/0124283 A1* | 5/2007 | Gotts et al. | 707/3 |
| 2007/0162422 A1* | 7/2007 | Djabarov | 707/2 |
| 2007/0208738 A1* | 9/2007 | Morgan | 707/6 |
| 2007/0288514 A1* | 12/2007 | Reitter et al. | 707/104.1 |
| 2008/0097842 A1* | 4/2008 | Tirumala et al. | 705/14 |
| 2008/0097843 A1* | 4/2008 | Menon et al. | 705/14 |
| 2008/0183681 A1* | 7/2008 | Messer et al. | 707/3 |
| 2008/0183698 A1* | 7/2008 | Messer et al. | 707/5 |
| 2008/0270250 A1* | 10/2008 | Bolivar et al. | 705/26 |
| 2008/0294621 A1* | 11/2008 | Kanigsberg et al. | 707/5 |
| 2008/0294624 A1* | 11/2008 | Kanigsberg et al. | 707/5 |
| 2008/0319947 A1* | 12/2008 | Latzina et al. | 707/3 |
| 2008/0319976 A1* | 12/2008 | Morris et al. | 707/5 |
| 2009/0043759 A1* | 2/2009 | Danish et al. | 707/5 |
| 2009/0055393 A1* | 2/2009 | Messer et al. | 707/5 |
| 2009/0070321 A1* | 3/2009 | Apartsin et al. | 707/5 |
| 2009/0112848 A1* | 4/2009 | Kunjithapatham et al. | 707/5 |
| 2009/0138376 A1* | 5/2009 | Smyers et al. | 705/27 |
| 2009/0164453 A1* | 6/2009 | Rothman | 707/5 |
| 2009/0240672 A1* | 9/2009 | Costello | 707/4 |
| 2009/0241058 A1* | 9/2009 | Costello et al. | 715/784 |
| 2010/0094865 A1* | 4/2010 | Haswell et al. | 707/723 |

OTHER PUBLICATIONS

"Live Product Search," Jan. 30, 2008, 11 pp., http://productsearch.spaces.live.com.

Murat Koyuncu, "An Alternative product Extraction Method for E-Commerce Applications," 18th International workshop on Database and Expert Systems Applications, Dept. of Computer Engineering, Atilim Univ. Ankara, Turkey, IEEE Computer Society, 2007, pp. 397-401.

Francesco Ricci, "Travel Recommender Systems," eCommerce and Tourism, Research Laboratory, IEEE Intelligent Systems, Nov./Dec. 2002, pp. 55-57.

Advanced Biotech Product Details "Gamma Decalactone Natural" http://www.adv-bio.com/ProductDetail.aspx? ProdNo=1124, 2010, Apr. 8, 2011.

"Product Details Page Layout," Opentaps Wiki, http://www.opentaps.org/docs/index.php/ Product_Details_Page_Layout, printed Apr. 8, 2011.

* cited by examiner

PRODUCT SUGGESTIONS AND BYPASSING IRRELEVANT QUERY RESULTS

BACKGROUND

Conventionally, a user receives query formulation assistance from a local application or a remote server that provides cached terms based on queries previously received by conventional search engines from the user or all users that submit queries to the conventional search engines.

Conventional search engines receive queries from users to locate webpages having terms that match the terms included in the received queries. Conventional search engines assist a user with query formulation by caching terms sent to the conventional search engines from all users of the conventional search engines on servers that are remote from the users and displaying one or more of the cached terms to a user that is entering a user query for the conventional search engines. The user selects any one of the cached terms to complete the query and receives a listing of webpages having terms that match the terms included in the user query.

Alternatively, a user may receive assistance with query formulation from a local application executing locally on the client device associated with the user. The application may locally cache terms—on the client device—included in the user queries that were previously submitted to the conventional search engines. The local application displays the locally cached terms to the user when the user is entering subsequent queries to the conventional search engines. In turn, the user may select one or more of the locally cached terms to include in the user query that is sent to the conventional search engines. The conventional search engines receive the user query and generate a listing of webpages having terms that match the terms included in the user query.

SUMMARY

A computer system configured with a computer-implemented method for generating product suggestions parses a user query and provides relevant product information to a user to refine the user queries received by a search engine. The user queries include terms that are related to a product. In turn, the computer system classifies the user queries as generic product queries or specific product queries. When the query is a generic product query, the computer system presents the user with one or more query refinements corresponding to specific products that are associated with the generic product query. In turn, the computer system receives a user selection of the one or more query refinements for a specific product without executing the one or more query refinements on a product database and formulates a specific product query based on the one or more query refinements selected by the user. When the query is a specific product query, the computer system locates a product details page that is relevant to the specific product query and returns the product details page in response to the specific product query.

This Summary is provided to introduce a selection of concepts in a simplified form. The selection of concepts is further described below in the Detailed Description. This Summary is not intended to identify key features or essential features of the claimed subject matter, nor is it intended to be used as an aid in determining the scope of the claimed subject matter.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "service" refers to a component executed by a server, where the component includes any combinations of hardware, software, or firmware.

A search engine configured with a product suggestion service refines user queries and generates product details pages that are linked to a subset of product suggestions provided by the product suggestion service. A user that selects a product suggestion included in the subset of the product suggestions is directed to the product details page of the specific product and bypasses a results page having webpages or other electronic documents that include the terms specified in the user queries or product suggestions. In certain embodiments, the subset of product suggestions are marked to provide visual queues to differentiate product suggestions that are linked to product details pages from unmarked product suggestions that are not linked to product details pages.

A computer system for generating product suggestions includes one or more client devices communicatively connected to a search engine. The client devices generate user queries and transmit the user queries to the search engine. The search engine includes a product suggestion service that assists the user in formulating a specific product query and directs the user to a product details page for a specific product based on user selection of a marked product suggestions. The marked product suggestions allow the user to bypass results pages having listings of webpages and electronic documents having terms that match the user query.

As one skilled in the art will appreciate, a computer system includes hardware, or a combination of software and hardware. The hardware includes processor and memories configured to execute instructions stored in the memories. In one embodiment, on one or more computer-readable media stores a computer-program product that includes computer-useable instructions for a computer-implemented method. Computer-readable media include both volatile and nonvolatile media, removable and non-removable media, and consider media readable by a database, a switch, and various other network devices. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
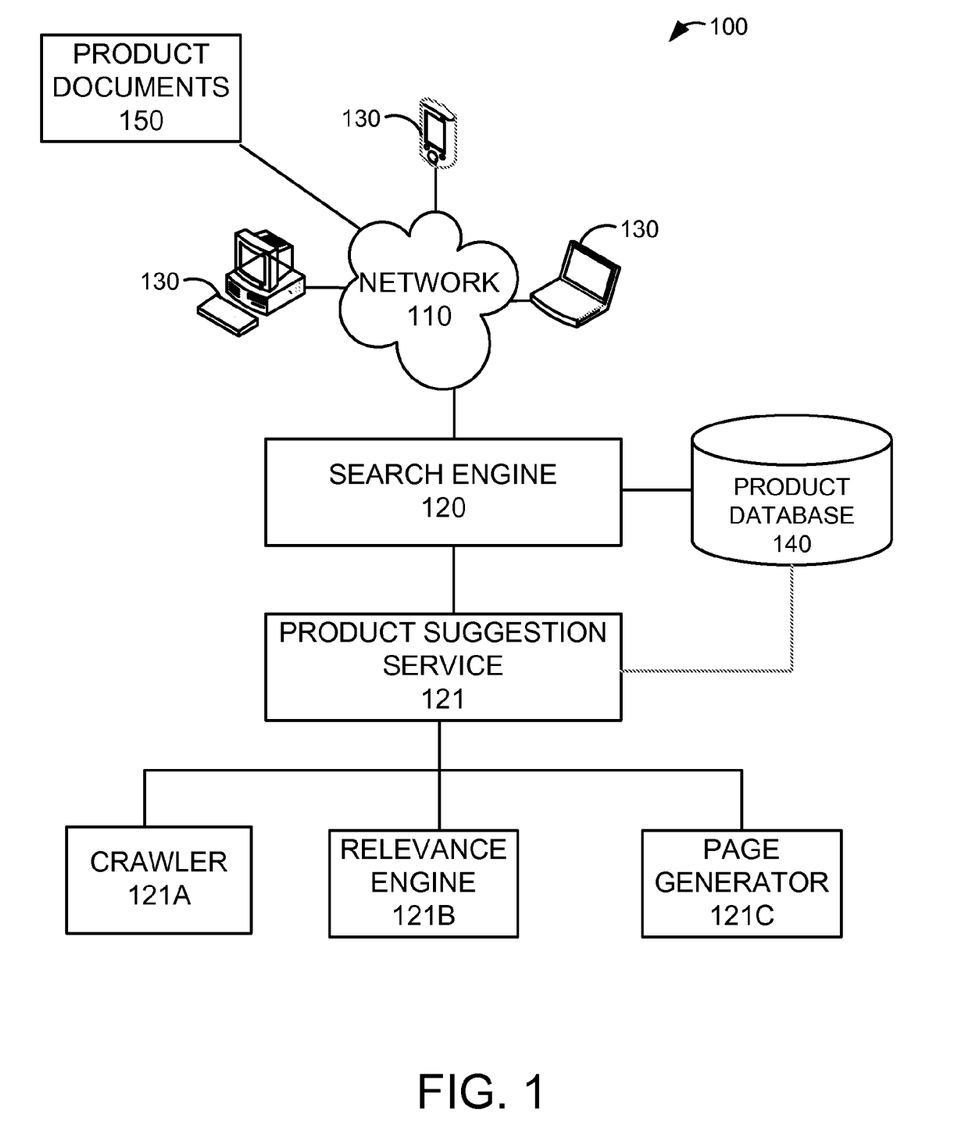
FIG. 1 is a network diagram that illustrates an exemplary operating environment.

FIG. 1 is a network diagram that illustrates an exemplary operating environment 100. The operating environment 100 includes a network 110, a search engine 120, client devices 130, product database 140, and product documents 150.

The network 110 is configured to facilitate communication between the client devices 130 and the search engine 120. The network 110 may be a communication network, such as a wireless network, local area network, wired network, or the Internet. In an embodiment, the client devices 130 communicate user queries to the search engine 120 utilizing the network 110. In response, the search engine 120 communicates product suggestions and results of the user queries to the client devices 130.

The search engine 120 responds to user queries received from the client devices 130. The search engine 120 includes a product suggestion service 121 that generates marked and unmarked product suggestions and product details pages based on the user queries received by the search engine 120. In some embodiments, the search engine 120 returns a product details page without a listing of results when a user selects a marked product suggestion. Moreover, the search engine 120 provides a listing of results that includes webpages or electronic documents that match the terms included in the user queries when the user chooses not to select any of the product suggestions or the user selects an unmarked product suggestion.

The client devices 130 are utilized by a user to generate user queries and select product suggestions. The client devices 130 include, without limitation, personal digital assistants, smart phones, laptops, personal computers, or any other suitable client computing device. The user queries generated by the client devices 130 may include terms that correspond to products that that the user is seeking.

The product database 140 stores information extracted from product documents 150. The extracted information includes product identifiers, names, trade names, generic names, price, type and color data for the each unique product in the product documents 150. The product database 140 is used by the product suggestion service 121 to provide information for product details pages, which are returned to the user selecting a marked product suggestions. The product database 140 is also used by the product suggestion service 121 to simultaneously generate query refinements related to partial queries as the user enters additional query terms.

In certain embodiments, the product database 140 may be a hierarchical structure. The hierarchical structure includes parent nodes having numerous children nodes that are more specific than the parent node. Labels for each node correspond to terms that are included in the product documents 150. For instance, a parent node labeled camera is associated with children nodes: film cameras and digital cameras. The labels for each parent and child node in the hierarchical structure are used to classify information included in the product documents 150. The children nodes may also include information for product attributes such as color, price, storage capacity, name, and size. The classification of the information included in the product documents 150 is automatically performed by the product suggestion service 121. In other embodiments, the classification of the information included in the product documents may occur manually or partially manual and partially automatic.

The product documents 150 include webpages, electronic documents, and non-electronic documents that describe a product. The products described in the product documents 150 may include products from all over the world, from various merchants, and from various distributors. The product suggestions service 121 crawls the network 110 to extract information from the product documents 150 and to store the extracted information in the product database 140 for each unique product.

The search engine 120 includes a product suggestion service 121 for generating product suggestions and product details pages for each unique product stored in the product database 140. The product suggestion service 121 is comprised of a crawler 121A, a relevance engine 121B, and a page generator 121C. The product suggestion service 121 provides appropriate product suggestions based on user queries received at the search engine 120.

The crawler 121A extracts information from product documents 150. The crawler 121A locates product documents 150 having product identifiers, product names, and trade names and extracts information for the product described in the product documents 150. In turn, the crawler 121A populates the product database 140 with the information extracted from the product documents 150.

The relevance engine 121B parses the user query to determine whether the user query—partial user query or complete user query—is a generic product query or a specific product query. The relevance engine 121B also identifies products in the product database that match terms included in the user query. The relevance engine 121B may return information for one or more products that are relevant to the user query based on popularity of the product, popularity of a trade name for the product, number of clicks for a webpage that corresponds to the product, or a set of user-defined relevance criteria. In some embodiments, the relevance engine 121B may use statistical models to identify products that are relevant to the user query.

In an embodiment, after the relevance engine 121B determines that the user query is a generic product query, the relevance engine 121B provides query refinements based on relevant product information to help a user formulate a specific product query. In turn, the relevance engine 121B may provide a product details page for a specific product related to the specific product query. Alternatively, when the relevance engine 121B determines that the user query is a specific product query, the relevance engine 121B returns an appropriate product details page without listing webpages or electronic documents that include the terms included the user query.

The page generator 121C creates the product details page from the information stored in the product database 140. The product details page may include information for local stores or repair shops that correspond to the product. In an embodiment, the product details page is dynamically generated by the page generator 121C in response to products identified by the relevance engine 121B, the location of the user that submitted the query, and the product suggestions selected by the user. The dynamically generated product details pages are linked to product suggestions for the product identified in the product suggestion, which is marked to indicate that clicking on this product suggestion directs the user to the corresponding product details page.

One of ordinary skill in the art understands and appreciates the operating environment 100 has been simplified for description purposes and alternate operating environments are within the scope and spirit of the above description.

In certain embodiments, the client device is configured with a web browser that displays a web page having a graphical user interface for receiving user queries for a search engine and for displaying product suggestions. The web page includes a search field, a drop-down box, and a search button. A user may enter terms for a user query in the search filed, and dynamically receive product suggestions as the user enters the user query. In some embodiments, the product suggestions include marked product suggestions and unmarked product suggestions. The user submits the user query to the search engine via the search button to obtain a listing of web pages or electronic documents that match the user query.

Figure 2:
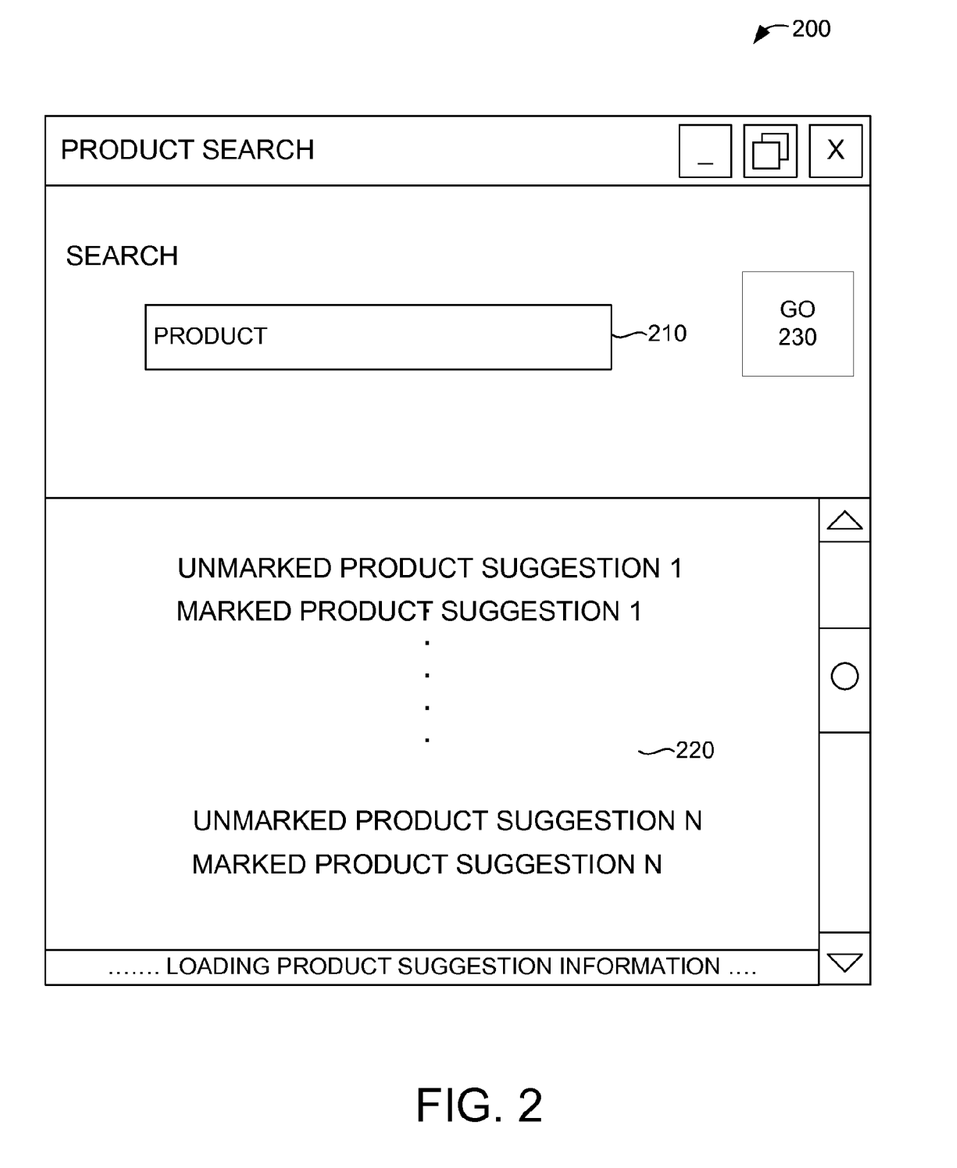
FIG. 2 is a screen shot that illustrates an exemplary graphical user interface for displaying product suggestions to a user.

FIG. 2 is a screen shot that illustrates an exemplary graphical user interface 200 for displaying product suggestions to a user. The graphical user interface 200 includes a search field 210, a drop-down box 220, and a search button 230. The user may populate the search field 210 with terms, i.e., "CAMERA," which corresponds to products that the user is seeking. The search button 230 is depressed by the user to submit the user query to the search engine.

In some embodiments, a product suggestion service may provide product suggestions in the drop-down box 220 to the user before the user selects the search button 230. The drop-down box 220 displays marked and unmarked product suggestions. The marked product suggestions are linked to product details pages and send the user directly to the product details pages without displaying a listing of webpages or electronic documents that match the terms of the product suggestions. In some embodiments, the marked suggestions are associated with visual identifiers—such as, special formatting, icons, and thumbnails—or audio identifiers. The unmarked suggestions are not linked to product details pages and provides a listing of webpages or electronic documents that match the unmarked product suggestion.

In certain embodiments, the client device communicates with a product suggestion service and product database to receive product suggestions for a user query that is being formulated by a user. The communication between the client device, the product suggestion service, and the product database occurs over a network. In an embodiment, the client device is located remotely from both the product suggestion service and the product database, which are located with a search engine that receives the user query.

Figure 3:
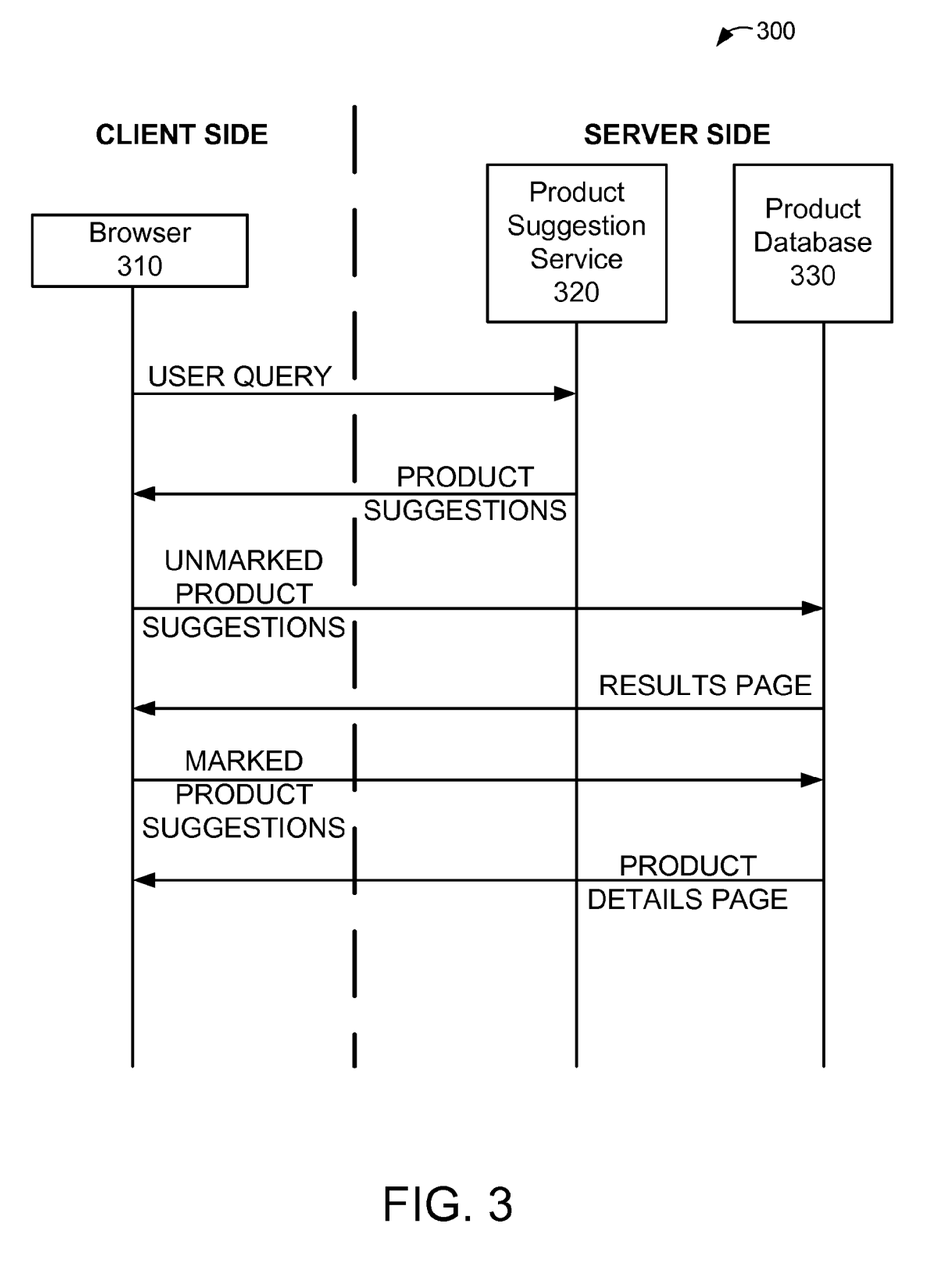
FIG. 3 is a messaging diagram that illustrates exemplary messages communicated between a browser, a product suggestion service, and a product database when generating product suggestions.

FIG. 3 is a messaging diagram that illustrates exemplary messages communicated between a browser 310, a product suggestion service 320, and a product database 330 when generating product suggestions. The browser 310 generates a "USER QUERY" message that includes partial or complete queries. The "USER QUERY" message is generated continuously while the user enters a query into the search box of a graphical user interface displayed by the browser. The "USER QUERY" message is sent to the product suggestion service 320, which generates a "PRODUCT SUGGESTIONS" message based on the terms included in the partial or complete queries. The product suggestions include products with similar trade names, products with similar prices, products with similar accessories, and products with similar product reviews. The "PRODUCT SUGGESTIONS" message includes both marked product suggestions and unmarked product suggestions. The product suggestion service 320 sends the "PRODUCT SUGGESTIONS" message to the browser 310, which displays the marked and unmarked suggestions included in the "PRODUCT SUGGESTIONS" message. A user may select either the marked product suggestions or the unmarked product suggestion to issue a query to a search engine.

If the user selects the unmarked product suggestion, the browser 310 generates a "UNMARKED PRODUCT SUGGESTIONS" message that encapsulates the selected unmarked product suggestion and sends the message to the product database 330. The product database 330 receives the "UNMARKED PRODUCT SUGGESTIONS" message and routes the message to the search engine to obtain a results page having webpages or electronic documents that match the terms included in the selected unmarked product suggestion. The product database 330 receives the results page and forwards a "RESULTS PAGE" message having the results to the browser 310, which displays the results to the user.

If the user selects the marked product suggestion, the browser 310 generates a "MARKED PRODUCT SUGGESTIONS" message that encapsulates the selected marked product suggestions and sends the message to the product database 330. The product database 330 receives the "MARKED PRODUCT SUGGESTIONS" message and locates a product details page that corresponds to the selected marked product suggestion. In turn, the product database 330 sends a "PRODUCT DETAILS PAGE" message to the browser 310. The "PRODUCT DETAILS PAGE" message only includes information for the product identified in the marked product suggestion. The browser 310 receives the "PRODUCT DETAILS PAGE" message and displays the product details page to the user.

Accordingly, a search engine configured with a product suggestion service provides a user savings in memory storage space and number of clicks required to receive relevant information in response to a user query. The user of the search engine may choose between marked and unmarked product suggestions. The marked product suggestions direct a user to a specific product details page for a specific product, and the unmarked product suggestions provide the user with a results page having webpages and electronic documents that match the terms included in the query.

Figure 4:
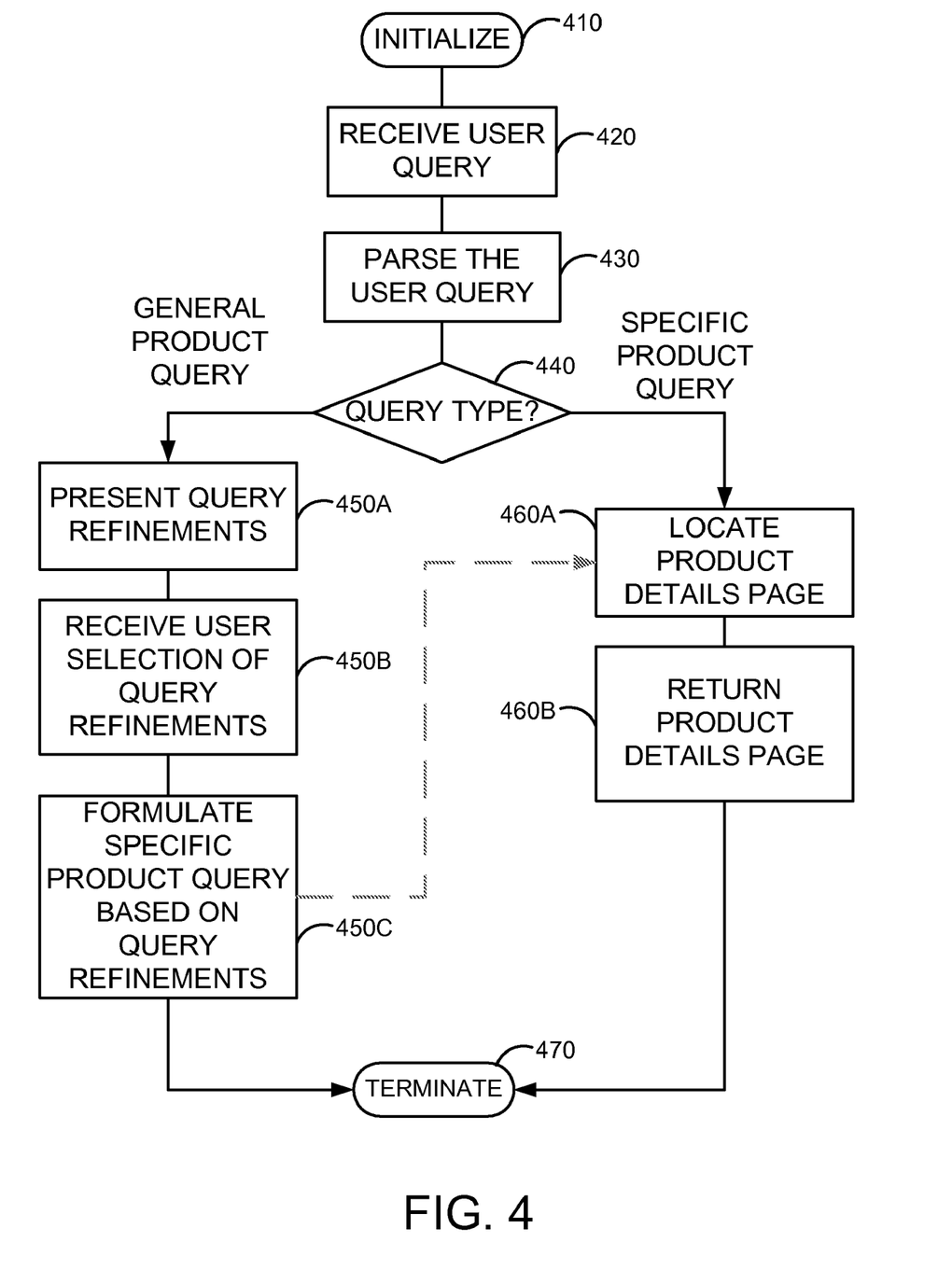
FIG. 4 is a logic diagram for generating product suggestions.

FIG. 4 is a logic diagram for generating product suggestions. The product suggestion service of a search engine is initialized in step 410. In step 420, the search engine receives a user query for one or more products. In step 430, the product suggestion service parses the user query. In step 440, the product suggestion service determines the query type for the user query.

In turn, if the type of the user query is general product query, the product suggestion service displays query refinements to the user, in step 450A. In step 450B, the product suggestion service receives user selection of the query refinements. In step 450C, the product suggestion service uses selected query refinements to formulate a specific product query. The computer-implemented method terminates in step 470. Optionally, before terminating the computer-implemented method, the product suggestion service may locate a product details pages for a specific product that matches the formulated specific product query, in step 460A, and return the matching product details page in step 460B.

However, if the type of the user query is specific product query, the product suggestion service locates a product details page for a specific product that matches the user query, in step 460A. In step 460B, the matching product details page is returned to the user. The method terminates in step 470.

In an embodiment, a product suggestion service for a search engine provides product information as the user enters a query string in a search box displayed by a browser. The product suggestion service crawls product documents and creates a product database with product information. The stored product information matching partial queries entered by the user is continuously returned and displayed to the user.

Figure 5:
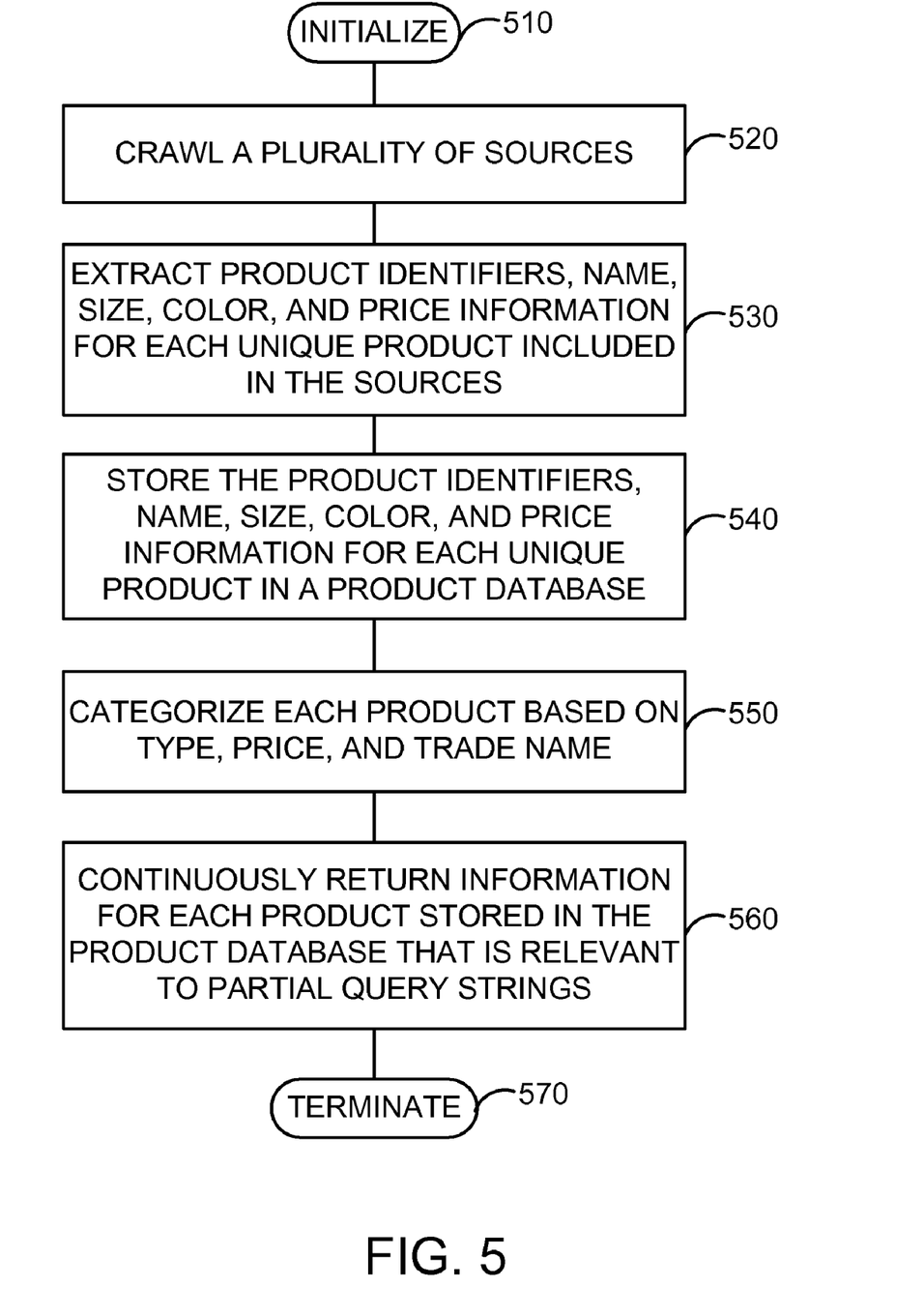
FIG. 5 is a logic diagram for proving product information.

FIG. 5 is a logic diagram for proving product information. The product suggestion service of a search engine is initialized in step 510. In step 520, the product suggestion service crawls a plurality of sources, which include electronic documents, webpages, and non-electronic documents. In step 530, the product suggestion service extracts product identifiers, name, size, color, and price information for each unique product included in the sources. In step 540, the extracted information is stored in a product database. In step 550, the product suggestion service categorizes the extracted information in the product database. In step 560, the product suggestion service continuously returns information for each product stored in the product database that is relevant to the partial query string received from the user. In step 570, the method terminates.

In summary, a search engine configured with a product suggestion service may bypass results pages having webpages or electronic documents with terms that match a user query. The search engine bypasses the results pages via marked product suggestions that direct a user to a product details page that is relevant to the user query. Additionally, the product suggestion service crawls product documents to generate the product details pages that are returned in response to selection of the marked product suggestion.

The foregoing descriptions of the invention are illustrative, and modifications in configuration and implementation will occur to persons skilled in the art. For instance, while the present invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more computer-readable media having computer-executable instructions embodied thereon that, when executed by a computing device, perform a method to generate product suggestions, the method comprising:
   receiving a user query for a product;
   parsing the user query to determine whether the user query is a general product query or a specific product query;
   if the user query is the general product query, presenting a user with one or more query refinements corresponding to specific products that are associated with the general product query and receiving a user selection of the one or more query refinements for at least one of the specific products without executing the one or more query refinements on a database, and formulating a new specific product query based on the user selection of the one or more query refinements; and
   if the user query is the specific product query, generating a product suggestions message relevant to the specific product query, the product suggestions message comprising one or more marked product suggestions linked to a respective one or more product details pages and comprising one or more unmarked product suggestions;
   receiving the product details pages from a product database for each of the marked product suggestions selected by the user; and
   returning the product details pages for each of the marked product suggestions selected by the user in response to the specific product query.

2. The one or more computer-readable media of claim 1, wherein the one or more marked product suggestions and the one or more unmarked product suggestions are generated remotely in response to the user generating the user query.

3. The one or more computer-readable media of claim 1, wherein the query refinements are displayed in a graphical user interface element.

4. The one or more computer-readable media of claim 3, wherein the graphical user interface element is a drop-down box.

5. The one or more computer-readable media of claim 4, wherein the drop-down box is populated with additional suggestions simultaneously with the user providing query strings.

6. The one or more computer-readable media of claim 1, wherein a relevant product details page includes similar trade name products similar price products, product accessories, or product reviews for the specific products.

7. A computer-implemented method for providing product suggestion information, the computer-implemented method using a computing device having memory, processor, and database subsystems and comprising:
   crawling a plurality of sources via a computer system processor;
   extracting product information comprising product identifiers, name, size, color, and price for each individual product included in the plurality of sources;
   storing the product identifiers, name, size, color, and price for each individual product in a product database;
   categorizing each individual product based on a type, a trade name, and the price;
   generating a product suggestions message in response to a specific product query from a user, the product suggestions message comprising one or more marked product suggestions linked to a respective one or more product details pages; and
   continuously returning the one or more product details pages for each marked product suggestion stored in the product database that is relevant to partial query strings formulated by the user as the user inputs additional query strings until the user completes the query strings.

8. The computer-implemented method of claim 7, wherein the plurality of sources provide product offers, product reviews, product descriptions, and other product documents.

9. The computer-implemented method of claim 7, wherein the plurality of sources include electronic product documents and non-electronic product documents.

10. The computer-implemented method of claim 7, wherein the product information is returned via a graphical user interface element that displays the product identifiers, name, size, color, or price for each relevant product that corresponds to the query strings received from the user.

11. The computer-implemented method of claim 10, wherein the graphical user interface element is a drop-down box.

12. The computer system of claim 7, wherein relevance is based on user clicks, similarity between the query strings and product information stored in the product database, and product popularity.

13. A computer system having processors and computer readable media configured for providing product suggestion information, the computer system further comprising:
   a product database to store product details pages for a plurality of associated specific products included in electronic and non-electronic documents received from a plurality of sources;

a graphical user interface (GUI) having a search box to receive a user query;

a relevance engine to receive the user query and to search the product database to locate relevant specific products and associated product details pages that match the user query;

a drop-down box that supplements the search box and provides a user with additional terms for the user query, wherein the additional terms are linked to one or more of the product details pages;

a product suggestions message comprising one or more marked product suggestions linked to one or more of the associated product details pages in response to a user specific products query via the GUI; and a user display of one or more of the product details pages associated with the one or more marked product suggestions selected by the user via the GUI.

14. The computer system of claim 13, wherein user selection of the additional terms redirects the user to the product details page.

15. The computer system of claim 14, wherein the additional terms that are linked to the product details page are marked to differentiate the additional terms linked to the product details page from other additional terms that are not linked to the product details page.

16. The computer system of claim 15, wherein the marked additional terms include unique formatting, additional characters, icons, graphics, or other special annotations.

17. The computer system of claim 13, wherein the product details page includes product price, color, style, availability and ordering information.

18. The computer system of claim 17, wherein the product details page is displayed without obtaining a list of search results.

* * * * *